Oct. 5, 1965  R. E. BOWLES  3,209,714
FLUID CONTROL SYSTEMS FOR FOILS
Filed Oct. 14, 1963  6 Sheets-Sheet 1

INVENTOR.
ROMALD E. BOWLES
BY
Hurwitz + Rose,
Attys.

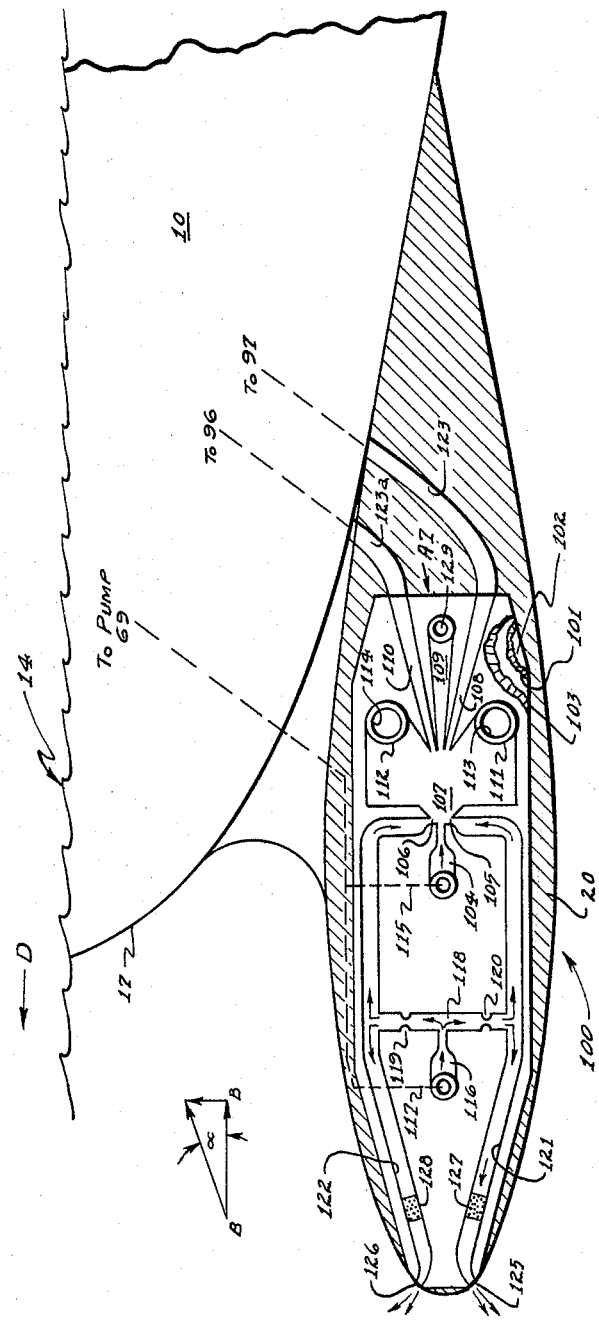

INVENTOR.
ROMALD E. BOWLES

INVENTOR.
ROMALD E. BOWLES

Oct. 5, 1965

R. E. BOWLES 3,209,714

FLUID CONTROL SYSTEMS FOR FOILS

Filed Oct. 14, 1963

INVENTOR.
ROMALD E. BOWLES
BY
Hurvitz + Rose,
Attys.

United States Patent Office 3,209,714
Patented Oct. 5, 1965

3,209,714
FLUID CONTROL SYSTEMS FOR FOILS
Romald E. Bowles, 12712 Meadowood Drive,
Silver Spring, Md.
Filed Oct. 14, 1963, Ser. No. 316,000
28 Claims. (Cl. 114—66.5)

The present invention relates to a fluid-operated, servo-control system for controlling the lift of a foil supporting an air or water craft during movement of the craft in the fluid medium.

Automatic pilots and servo-control systems of foil supported craft conventionally employ gyroscopes, accelerometers, electrical transducers and other types of sensing devices to monitor the position of the craft relative to the free surface of the fluid medium on or in which the craft is supported, or the position of the craft relative to some inertial reference plane. Computers and amplifying systems translate the signals detected by these sensing devices to a common angle of attack command signal and this signal is applied to a mechanical actuator for changing the angle of attack of one or more of the foils, thereby effecting relocation or reorientation of the craft relative to the surface of the medium or the inertial reference plane. Existing mechanical, electro-mechanical and electronic monitoring devices are generally delicate and require fine adjustment for proper operation and it would therefore be advantageous for many applications to eliminate as far as possible moving mechanical elements and sensitive electronic devices from the control system.

An inherent disadvantage common to conventional foil control systems is the requisite necessity of converting or translating from one type of energy system to another type of energy system for effecting corrective action. For example, a conventional system for changing the angle of attack of a foil typically comprises a device that monitors a fluid static pressure, circuitry that converts the pressure signal into an electrical signal, with the electrical signal in turn energizing an electro-mechanical device that reorients the foil in accordance with the signal received thereby to correct the foil lift. It would be preferable if the pressure signal monitored could directly effect a change of foil lift without further translation of the pressure signal to an electrical signal and the electrical signal to a mechanical force for effecting a change of foil lift.

In accordance with the present invention, an air or water craft, as for example a hydrofoil craft, is provided with a plurality of support foils, one or more of these foils being a "servoed foil," and incorporates monitors or sensors responsive to certain conditions during movement of the craft on or through the water. Each servoed foil senses the lift conditions relative to the particular local dynamic conditions of the medium in which the foil is traveling and also senses the static pressure at foil level as an indication of foil depth. The static pressure is damped and time averaged by the static pressure sensor to eliminate the effect of higher frequency pressure fluctuations caused by choppy water surface conditions. The lift and static pressure sensors provide fluid control signals which are combined with a fluid command depth signal, corresponding to the correct depth of the hydrofoil, to provide an amplified fluid output signal that operates directly on the foil by action or reaction to adjust its position, thereby to maintain the depth and lift of the hydrofoil constant as it moves through the water.

The control system may also be provided with fluid rate gyroscopes that have no moving parts and yet produce an output signal in the form of a fluid pressure or flow signal which is a function of the pitch and roll of the foil. These fluid signals are summed in a pure fluid amplifier with the previously mentioned input control signals of the system to improve the stability of the craft. The term "fluid" includes liquid, gas and combinations of liquid and gas.

The system may also be provided with devices for controlling the lift coefficient of the foil or foils during take-off and crash diving during which times the lift coefficients normally available are insufficient or too great to permit the desired maneuver.

Broadly therefore, it is an object of this invention to provide a control system for foils incorporating fluid devices having either a minimum, or no moving parts for the operation and control thereof.

More specifically, it is an object of this invention to provide a fluid control system for controlling the lift of a foil, both during normal cruising conditions and extraordinary conditions, the control system comprising sensing, computing and amplifying systems, the computing and amplifying systems summing fluid signals received from sensing devices and issuing a command signal for controlling the lift of the foil in the fluid medium through which the foil is moving.

Another object of this invention is to provide a fluid control system of the type described in the foregoing object for controlling the orientation of foils of subcavitating and supercavitating types.

The above and still further objects, features and advantages of the present invention will become apparent upon consideration of the following detailed description of several specific embodiments thereof, especially when taken in conjunction with the accompanying drawings, wherein:

FIGURE 1 of the accompanying drawings illustrates a sectional side view of a foil attached to a hydrofoil craft and, in addition, schematically shows control systems for varying the angle of attack of the foil;

FIGURE 4 illustrates a sectional side view of a probe incorporating a pure fluid lift sensing and measuring system;

Figure 1:
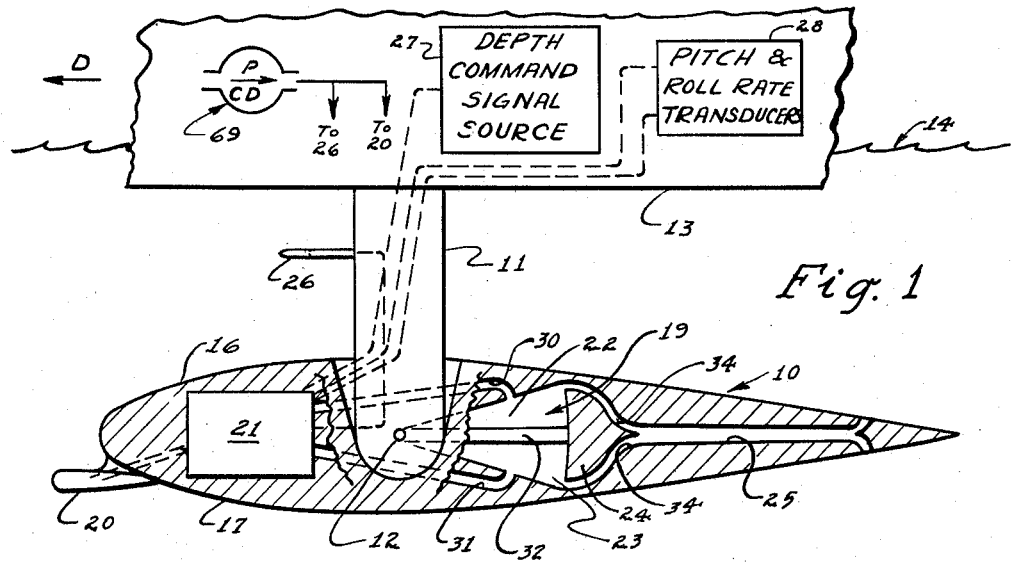

Referring now specifically to FIGURE 1 of the drawings for a more complete understanding of the invention, there is illustrated an air or hydrofoil 10 intended to be propelled in the direction of the arrow D. The foil 10 is mounted for pivotal movement to a strut 11 by means of a pivot pin 12 having the ends thereof secured in the foil 10. The pin 12 is preferably located just forward of the center of pressure of the foil 10 and the strut 11 is affixed to the bottom of a body or craft indicated generally by the reference numeral 13, which is to be supported in a fluid medium by two or more foils of similar configuration to that of the foil 10. For the sake of simplicity of explanation, the control system for a single foil is described in detail, although it is to be appreciated that the fluid control system of this invention may also control the remaining foil or foils employed for supporting the craft 13.

As to the number of foils associated with any particular craft, various foil arrangements are presently provided. A particular craft may employ a single large foil toward the bow and a smaller foil toward the stern. The stern foil would preferably be servoed in accordance with the present invention. A craft may employ two transversely aligned foils toward the bow and a single servoed foil in the rear. The two forward foils may be servoed instead. Alternatively, all three foils may be servoed as subsequently described. On a large vessel, four or more foils may be employed in rows along the sides with all foils servoed.

Returning to FIGURE 1, the center of pressure of the foil 10 is preferably displaced a relatively short distance from the pin 12 in a direction opposite that of the arrow D, a distance great enough to insure stability of the foil 10 during movement through the medium 14, and yet located sufficiently close to the pin 12 so that undesirable torque amplitudes are not developed about the pin 12 by foil flutter or lift forces. The foil 10 is formed by upper and lower surfaces referred to by the numerals 16 and 17, respectively, the surfaces tapering from the leading edge of the hydrofoil to the trailing edge to provide, for example, a conventional, subcavitation type of foil.

Extending forward of the leading edge of the foil 10 is a lift sensor 20, FIGURE 1, for supplying fluid signals corresponding to forces of lift predicted by the sensor to a pure fluid control system 21 preferably housed within the foil 10. The fluid control system 21 supplies differential fluid pressure signals to upper and lower servo chambers 22 and 23, respectively, of a servo unit 19 embodied in the foil 10. A dividing wall 24 is affixed to the hydrofoil 10. A dividing vane 32 is rigidly attached to strut 11 providing a fixed wall between the upper and lower servo chambers 22 and 23, respectively. A dividing or island member 24 is designed so that fluid from the servo unit 19 egresses into a venting passage 25. Fluid egressing from the passage 25 discharges to the surrounding fluid medium 14 or into a sump (not shown).

In addition to the lift sensor 20 and a depth sensor 26 which are responsive to variations in different parameters of foil position relative to the fluid medium, there is provided a depth command signal source 27 and a pitch and a roll rate transducer referred to generally by numeral 28 which monitor pitch and roll rate of the craft 13. Each of the above elements develop fluid control signals for controlling the operation of the pure fluid control system 21 in response to variations detected in various parameters to be monitored. The depth command signal source 27 may be housed in the craft 13 and the pitch and roll rate transducer 28 may be housed either in the craft 13 or the transducers may be attached to the strut 11. The signals from the various monitoring systems are received and combined by the control system 21.

The fluid output signals issuing from the pure fluid control system 21 are received by output passages 30 and 31 formed in the foil 10, the passages 30 and 31 terminating in essentially opposed outlets for issuing fluid into the upper and lower (as illustrated in FIGURE 1) servo chambers 22 and 23, respectively. A dividing vane 32 is fixedly connected to the strut 11, the width of the vane 32 being substantially equal to the width of the chambers 22 and 23 so that pressure differentials in the chambers 22 and 23 produce pivotal movement of the foil 10 relative to the strut 11 about the pin 12. For example, if the output passage 30 received fluid at a greater pressure than the output passage 31, the pressure in the chamber 22 evceeds that of the chamber 23, and the resulting build-up in pressure in the chamber 22 tends to produce counterclockwise pivotal movement of the foil 10 about the pin 12. Constrictions 34 are formed in the channels between the divider 34 and the spaced adjacent walls of the foil 10 so as to permit pressure to be developed in the chambers 22 and 23. The constrictions, however, must not be great enough to inhibit relatively rapid outflow of fluid so that, upon reduction or increase in flow to a chamber, the pressure in the chamber may rapidly adjust to the new condition.

Figure 2:
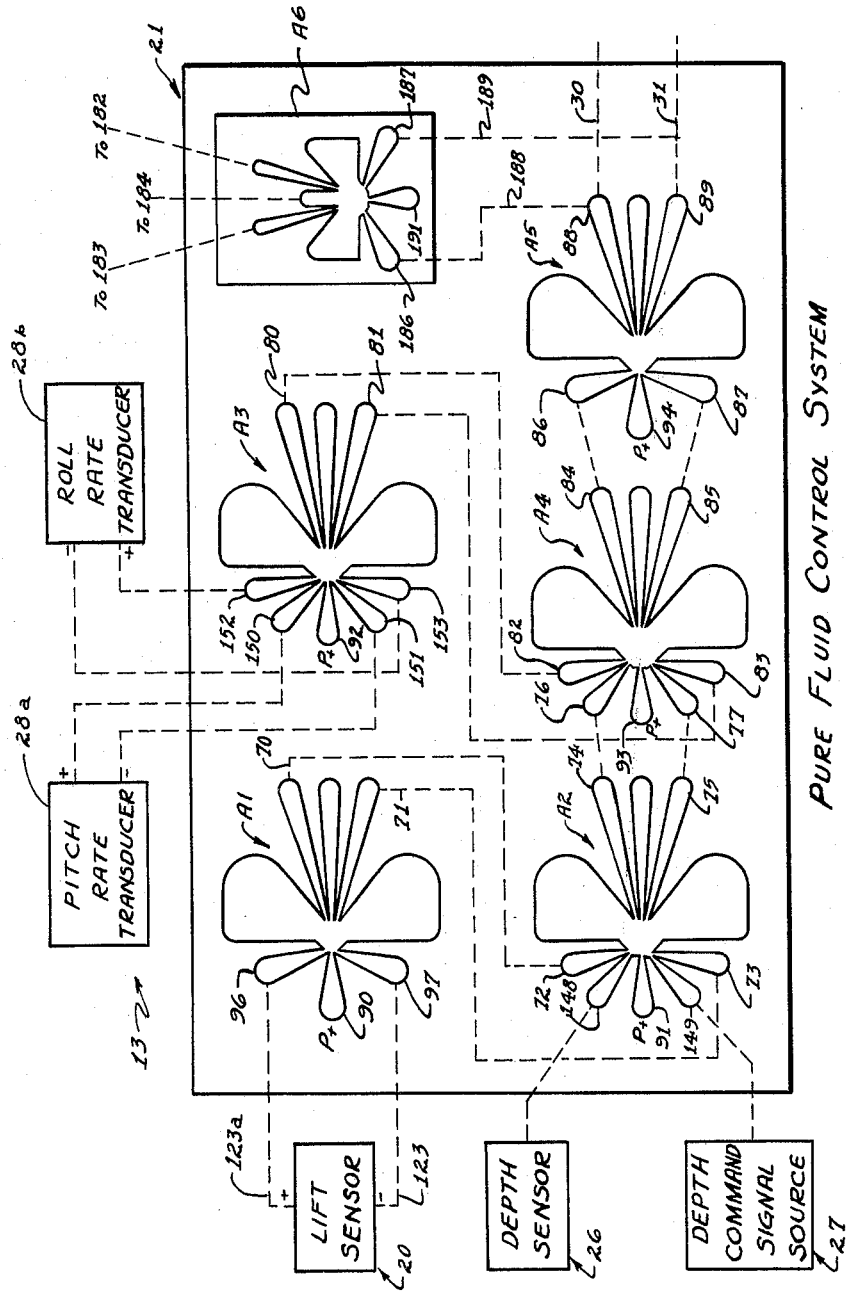
FIGURE 2 illustrates a fluid computing and amplifying system employing fluid signals derived from various fluid monitoring devices responsive to the depth of the foil below the surface of the medium, orientation dynamics of the craft and fluid dynamic characteristics of the medium surrounding the foil.

Referring now to FIGURE 2 of the accompanying drawings, there is illustrated in detail the control system 21 of FIGURE 1 and includes six pure fluid amplifiers, the amplifiers being respectively designated as A1, A2, A3, A4, A5 and A6, included in the pure fluid control system 21. Since pure fluid amplifiers form an essential element in the control system of the present invention, it is necessary to understand the nature and operation of a typical pure fluid amplifier. To this end, reference is directed to FIGURE 3, wherein a single pure fluid summing amplifier 39 is illustrated.

The pure fluid summing amplifier 39 is preferably formed as a sandwich-type structure of three flat plates 40, 41 and 42, sealed together in a fluid-tight relationship by means of adhesives, machine screws or any other suitable means. The middle plate 41 is molded, etched or otherwise formed to provide channels in at least one surface thereof to provide the configuration shown in FIGURE 3. The plates 40 and 42 serve to confine fluid flow in the pure fluid summing amplifier 39 to one plane. The channel configuration formed in the plate 41 provides a power nozzle 43, generally opposed control nozzles 44, 45 and 46, 47, a fluid interaction chamber 48, having sidewalls 49 and 50 set back remotely from the outlet orifice of the power nozzle 43, and three output passages designated by the numerals 54, 55 and 56 positioned to receive fluid passing through the interaction chamber 48. A pair of openings 57 and 58 are provided in the plate 40 contiguous with the sidewalls 49 and 50, respectively, the openings 57 and 58 being bored through the plate 40. The openings 57 and 58 discharge fluid received into a sump (not shown) or to an ambient pressure environment and serve to defeat boundary layer effects and insure that equal pressures are maintained on opposite sides of the power stream flowing into the chamber 48 except for those pressures resulting from fluid flow from the control nozzles 44, 45, 46 and 47.

Figure 3:
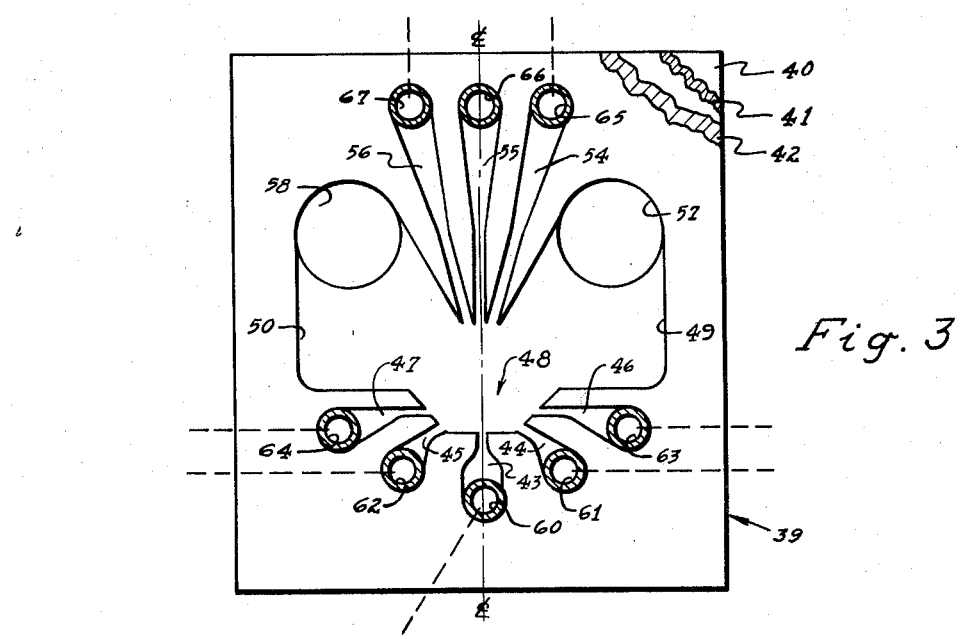
FIGURE 3 is a plan view of a typical pure fluid pressure amplifier utilized in the fluid amplifying and computing system of this invention.

The pure fluid summing amplifier 39 is preferably symmetrical with respect to a centerline CL taken through the center output passage 55 and the power nozzle 43, as shown. Tubes 60, 61, 62, 63, 64, 65, 66 and 67 may have the ends thereof threadedly connected into threaded holes formed in the plate 42, and supply and receive fluid from the amplifier 39, the tubes 60, 61, 62, 63 and 64 supplyng fluid to the amplifier 39 and the tubes 65, 66 and 67 receiving fluid from the amplifier, i.e., passages 54, 55 and 56, respectively. The extensions or sections of all tubes are indicated by dotted lines, as illustrated in FIGURE 3.

The operation of pure fluid summing amplifier is now well known to those working in the art and, for this reason, it suffices to state that a main or power stream is received by the tube 60 and issues from the power nozzle 43 as a well-defined stream into the interaction chamber 48. Control fluid streams may be received by any or all the tubes 61, 62, 63 and 64 and these fluid streams issue as control streams from the control nozzles 44, 45, 46 and 47, respectively, to interact with, and thereby effect amplified directional displacement of the power stream in the interaction chamber 48. If the control nozzles 44, 45, 46 and 47 are all issuing equal magnitude fluid control streams in interacting relationship with the power stream, or if there is no control fluid input supplied to any of these control nozzles, the power stream flows mainly into the center output passage 55 and issues from the tube 66. Due to the fact that there is some spreading of the power stream, equil portions thereof flow into the passages 54 and 56. The tube 66 is preferably connected to a sump or ambient pressure environment and the fluid signal from the tube 66 is therefore not generally utilized as an output signal. The displacement of the power stream issuing from the power nozzle 43 in the interaction chamber 48 is effected by differentials in pressure between control streams issuing from opposed control nozzles. For example, the power stream is partially or substantially completely deflected into the output passage 56 if one or both of the control nozzles 44 and 46 issues a control fluid stream having a pressure greater than that applied by the fluid stream or streams issuing from the control nozzles 45 and/or 47.

Conversely, the power stream is partially or substantially completely displaced into the output passage 54, if, singly or in combination, the control nozzles 45 and 47 produce a momentum transverse of the power stream in the interaction chamber greater than that produced by fluid issuing from the control nozzles 44 and 46 singly or in combination. As will be evident, the differentials in pressure between the output passages 54 and 56 depend upon the deflection of the power stream by fluid control streams, the angle of deflection being a function of the differences in control flow on opposite sides of the stream.

Since the power stream has a considerably greater momentum than the fluid of any of the control streams, and since the smaller momentum control streams effect displacement of the power stream, amplification as well as summation of fluid control signals is achieved by control stream displacement of the power stream in the pure fluid summing amplifier 39. Although two pairs of control nozzles are illustrated in FIGURE 3, a single pair of opposed control nozzles may alternatively be used in those applications where only two sets of control fluid pressure signals are to be summed and amplified. A more detailed disclosure of pure fluid pressure amplifying systems of the type described briefly hereinabove may be found in U.S. Patent No. 3,024,805 issued to B. M. Horton. Since it is an objective of this invention to reduce as far as possible the number of moving parts required in the control system, pure fluid amplifiers are preferable to other types of amplifiers since they provide pressure signal summation and amplification without employing any moving mechanical parts.

Referring again to FIGURE 2 of the drawings, output tubes or passages 70 and 71 of the fluid amplifier A1 are connected to control nozzles 72 and 73 of the fluid amplifier A2 and the output tubes 74 and 75 of the amplifier A2 are connected to control nozzles 76 and 77, respectively, of the fluid amplifier A4. The output tubes 80 and 81 of the amplifier A3 are connected to the control nozzles 82 and 83, respectively, of the amplifier A4, and the output tubes 84 and 85 of the amplifier A4 are connected to control nozzles 86 and 87, respectively, of the amplifier A5. The output passages 88 and 89 of the amplifier A5 are connected to supply fluid to the output passages 30 and 31, respectively, and to the tubes 188 and 189, respectively. The passages 30 and 31 supply differential fluid pressures to the upper and lower chambers 22 and 23, FIGURE 1, of the servo unit 19, FIGURE 1, whereas a second set of output tubes 188 and 189 of amplifier A5 are connected to supply fluid control signals to control nozzles 186 and 187, respectively, of the amplifier A6.

The amplifiers A1, A2, A3, A4, A5 and A6 are provided with power nozzles 90, 91, 92, 93, 94 and 191, respectively, for supplying power streams to the interaction chambers of the amplifiers. As will be apparent to those working in the pure fluid amplifying art, the amplifiers A2, A4 and A5 may be staged and so designed that the power nozzles 91, 93 and 94, respectively, receive increasing magnitude power streams so that successively increasing pressures are produced by each of these amplifiers. The same result may be obtained even though the same pressure is supplied to all power nozzles if the amplifiers are suitably designed as to configuration and size. The system employing identical amplifiers and increasing supply pressures is employed for ease of fabrication. Fluid for the power nozzles 90, 91, 92, 93, 94 and 191, inclusive, may be supplied to those power nozzles through tubing from sources (not shown) of pressurized fluid housed in the craft 13, the strut 11 being provided with suitable channels to enclose such tubing. With reference to the amplifier A1, it can be seen that the control nozzles 96 and 97 of this amplifier receive fluid control signals from the lift sensor 20. The lift sensor 20 is utilized to predict forces of lift acting on the foil 10 and the differential output signal of the lift sensor is proportional to the product of the dynamic pressure and the angle of attack of the foil 10 relative to a preselected reference axis or plane. Since it is highly advantageous to reduce the number of moving mechanical parts in the foil control system and to eliminate the need for converting from one type of energy to another, the lift sensor 20 illustrated in FIGURE 4 of the drawings is preferable to conventional types of lift sensors.

Referring now to FIGURE 4, the lift sensor 20 is incorporated in a probe 100 which is rigidly attached to the lower surface 17 of the foil 10 in the embodiment illustrated. A servoed sensor, movable with respect to foil 10, may be employed for purposes to be explained subsequently. As the probe 100 and foil 10 move through a fluid medium; for instance, water, forces of lift are received by the craft 13 and the direction of these forces depends upon the angle of attack ($\alpha$) of the foil 10 relative to some reference axis or plane, designated by the line B—B and established by relative motion of the foil 10 through the fluid medium 14. The angle of attack ($\alpha$) is taken as positive in FIGURE 4 since the lift forces developed by movement of the foil through the water tend to urge the foil 10 upwardly whereas negative angles of attack ($\alpha$) tend to urge the foil 10 downwardly deeper into the water. The lift of most foils is proportional to the product of the angle of attack ($\alpha$) and the free-stream, dynamic pressure caused by movement of the foil through the water over the range of angles of attack ($\alpha$) encountered in normal operation.

The lift sensor 20 is adapted to sense the magnitude or amplitude of lift forces developed on the foil 10 during movement through water and to provide a differential output signal proportional thereto. The output pressure signals from the sensor 20 are measured and amplified by applying the signals to a pure fluid amplifier A7, the pure fluid amplifier A7 being of the aforedescribed stream interaction type.

The cavities, passages and nozzle needed to provide the pure fluid sensor 20 may be easily formed in a flat plate 101 by the methods described previously in regard to the forming of pure fluid amplifiers, and the plate 101 is sealed between flat plates 102 and 103 in a fluid-tight relationship. Since the cavities, passages and nozzle of the sensor 20 are formed by a sandwich-type construction, the plates forming the passages, etc. of the sensor 20 may also form the amplifier A7 so that the amplifier and sensor passages are combined in a single sandwich-type structure, as shown in FIGURE 4. For the purposes of clarity, the plates 101, 102 and 103 are shown to be composed of a clear plastic material; however, it should be understood that any material compatible with the working fluid may be employed.

The amplifier A7 comprises a power nozzle 104, a pair of substantially opposed control nozzles 105 and 106, an interaction chamber or region 107, output passages 108, 109 and 110, and flow outlets 111 and 112. The tubes 113, 114 and 129 receive fluid from the outlets 111, 112 and 109, respectively, and discharge fluid so received into the fluid medium 14 or into a sump (not shown). A constant pressure supply source 69, FIGURE 5, supplies fluid to the power nozzle 104 by means of a tube 115.

Figure 5:
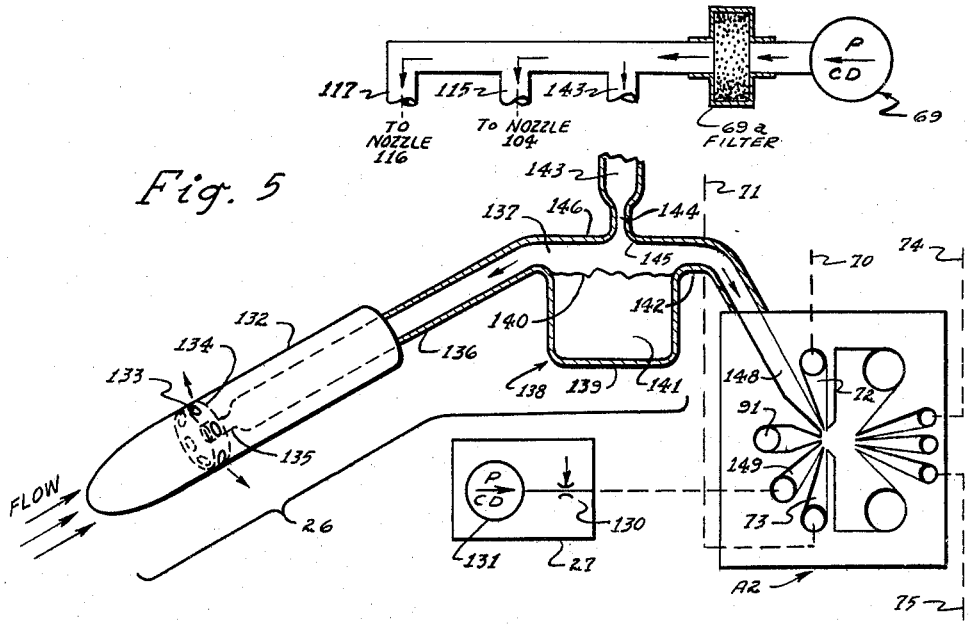
FIGURE 5 illustrates a system for sensing the static pressure at the running depth of the foil, the fluid signal produced by the system being compared to that of a preselected running depth signal so that the running depth of the foil can be changed until it is at the preselected depth.

The lift sensor 20 includes a nozzle 116 receiving fluid filtered of extraneous matter by filter 69a and at constant pressure from the source 69, FIGURE 5, by means of a tube 117. The nozzle 116 discharges fluid into a transverse tube 118 having tube constrictions 119 and 120 formed therein adjacent the discharge end thereof, the constrictions restricting flow from the tube 118. Flow from the tube 118 egresses into a parallel tubing system comprising a pair of equi-diametered tubes 121 and 122, the constrictions 119 and 120 isolating the pressure in tube 118 from pressure variations in tubes 121 and 122. One end of each of the tubes 121 and 122 terminates in a control nozzle 105 and 106, respectively, of the amplifier A7, the other ends terminating in equi-diametered ports 125 and 126, respectively. A pair of porous plugs 127 and 128 are inserted into the tubes 121 and 122, respectively, for providing resistance to flow from the tubes 121 and 122. The tubes 121 and 122 could be provided with other types of fluid resistances such as constrictions or nozzles as alternatives to porous plugs.

The resistance to flow provided in the tube 121 by the fluid resistance 127, port 125 and nozzle 105 and in the tube 122 by the fluid resistance 128, port 126 and nozzle 106 permits the development of relatively high pressures in each of the tubes 121 and 122, respectively. The pressures in these tubes vary directly as the backloading pressures exerted on the lift sensor 20 at the ports 125 and 126. Preferably, the amplitude of the supply pressure received by the nozzle 116 is great enough so that flow always egresses from the ports 125 and 126 during operation of the sensor 20, the amounts of flow egressing independently from each of the ports 125 and 126 being dependent upon the external pressures developd by the fluid medium 14 at the ports 125 and 126, respectively.

The lift force developed by the foil 10 is proportional to the product of the angle of attack ($\alpha$) relative to the reference axis B—B and the dynamic pressure developed as a result of motion of the foil through the fluid medium 14. These are the same factors that determine the backloading on ports 125 and 126 so that the differential in pressure sensed at the ports 125 and 126 is a function of the lift developed by the foil 10. This function may be made a linear function if the ports 125 and 126 are properly positioned with respect to the leading surface of the probe 100. The linearity of the function holds for certain ranges of angle of attack ($\alpha$) variation with respect to the reference axis B—B of the foil 10.

It is desirable that the lift be maintained relatively constant even though the foil is subjected to varying angle of attack and dynamic pressures as it passes through waves in the fluid medium 14.

Expressing this empirically, the lift is equal to the product of some function of dynamic pressure and some function of the angle of the sensor relative to the flow pattern of the fluid surrounding the sensor immediately in front of the foil. If the dynamic pressure varies due to a change in speed of the craft, wave motion, changes in velocity of the surrounding currents, etc. then the lift changes; and this is sensed as a variation in the differential in pressure in passages 121 and 122. Thus, the gain of the sensor as related to angle of attack is a function of dynamic pressure. If the angle of attack changes due to change in position of the foil in the fluid medium, changes in direction of the currents, etc., the lift changes; and again, this is detected as a change in the differential in pressure between channels 121 and 122.

Assume for the purpose of explanation that the angle ($\alpha$) is desired to be maintained zero and that, under this condition, the ports 125 and 126 are symmetrical with respect to the axis B—B. Both ports are equally backloaded when angle ($\alpha$) is zero; the dynamic pressure has no effect since it determines the gain of the sensor; and a null output pressure differential appears across the passages of the amplifiers A7 and A1. This null output signal will not affect the displacement of the power streams in any of the amplifiers A7, A1, A2, A4, A5 or A6, inclusive. With a change of angle ($\alpha$), for instance, to a positive angle of attack, the port 125 is exposed to a greater pressure than the port 126 causing a greater backloading of flow from the tube 121 than the new backloading of flow from the tube 122. Since the nozzle 116 supplies fluid at constant pressure to the tube 118 and hence substantially equal flows to tubes 121 and 122, the increase in back pressure applied to tube 121 combined with the decrease in back pressure applied to tube 122 causes more fluid to issue from the control nozzle 105 than issues from the control nozzle 106. The gain parameter, dynamic pressure, determines the differential signal level actually produced by the gain change in angle of attack. The difference in the fluid flows from nozzles 105 and 106 displaces the power stream in the amplifier A7 from the passage 109 so that a greater portion flows into the passage 110 and the output tube 123a than flows in the passage 108 and the output tube 123.

Referring now to FIGURE 2 and to the amplifier A1, the output tube 123a is connected to the control nozzle 96 and the output tube 123 is connected to the control nozzle 97 of that amplifier so that the power stream issuing from the power nozzle 90 of the amplifier is displaced whereby a greater quantity of fluid is received by the output tube 71 than is received by the output tube 70. This in turn causes a greater quantity of control fluid to issue from the control nozzle 73 of the amplifier A2 than issues from the control nozzle 72. Thus, the power stream issuing from the power nozzle 91 of the amplifier A2 is displaced to supply a greater quantity of fluid to the output tube 74 than is supplied to the output tube 75, assuming null or equal amplitude control signals from the sensor 26 and the source 27. The corresponding control nozzles 76 and 77 of the amplifier A4 thereupon receive corresponding differential pressure control signals so that a greater proportion of the power stream issuing from the power nozzle 93 in the amplifier A4 is displaced into the output tube 85 producing a pressure in the control nozzle 87 of the amplifier A5 greater than that in the control nozzle 86. The larger magnitude control stream issuing from the control nozzle 87 displaces a greater proportion of the power stream issuing from the power nozzle 94 of the amplifier A5 into the output passage 88 and this pressure is received by the passage 30 whereupon the pressure in the upper chamber 22 increases to a value above the pressure of the lower chamber 23. This differential in pressure between the upper and lower chambers causes counterclockwise pivotal movement of the foil 10 about the pin 12, as discussed previously, so that the angle of attack ($\alpha$), FIGURE 4, is decreased to some predetermined value, for instance, zero.

Conversely, if the port 126 is exposed to a greater pressure than that sensed by the port 125, the control nozzle 106 of the amplifier A7 issues a greater magnitude control stream than that issuing from the control nozzle 123 so that the power stream issuing from the power nozzle 104 is displaced into the output tube 108. The differential in pressure appearing across the output tubes 123 and 123a is transmitted through the fluid amplifying system A1, A2, A4, A5, resulting in an increase in pressure in the lower chamber 23 of the servo unit 19 so that the foil is pivoted clockwise about the pin 12 to effect a corrective change in the angle of attack ($\alpha$) thereby increasing the lift of the foil and decreasing the pressure sensed by the port 126 until both ports 125 and 126 sense equal pressures indicating zero angle of attack.

The lift sensor 20 in conjunction with the control system 21 and the servo unit 19 function as described to fluid is incompressible, then the fluid capacitance should be elastically deformable or should have a free surface. Typical fluid capacitances are provided by pressure-loaded, flexible diaphragms which separate two fluids of different densities and elastically deformable tanks or containers.

It is assumed, for the purpose of explanation, that the fluid employed in the sensor 26 is incompressible, for example, water, and that the capacitance 138 includes a cylindrical casing 139 and a circular, flexible diaphragm 140 for allowing variations in the capacitance of the upper chamber 137 resulting from increases and decreases in water pressure in the tube 136. The peripheral edges of the diaphragm are sealed to the inner walls of the casing 139 so that fluid in the upper chamber 137 is kept separated from fluid in the lower chamber 141 of the casing 139. The fluids on either side of the diaphragm 140 should have different compressibility, the fluid having greater compressibility being disposed in the lower chamber 141. Assuming that water is to be used as the working fluid in the sensor 26, a compressible fluid, such as air, may be used in the lower chamber 141. The position of the diaphragm 140 and the volume of the chamber 137 vary in accordance with a variation in pressure against the opposite face of the diaphragm, the volume of the chamber 137 being governed by the flexibility of the diaphragm 140 and the relative pressures applied against the diaphragm by the fluids in each chamber.

If the water pressure in the upper chamber 137 increases, the diaphragm 140 expands downwardly into the lower chamber 141 compressing the air into a smaller volume and thereby increasing the volume of the upper chamber 137. Conversely, a reduction in water pressure in the upper chamber produces an upward expansion of the diaphragm by expansion of the air in the lower chamber 141, thereby decreasing the volume of the upper chamber 137.

An output tube 142 extends from an opening in the casing 139 into the upper chamber 137 of the fluid capacitance 138 and supplies fluid pressure signals to the control nozzle 148 of the fluid amplifier A2. The nozzle 148 provides a resistance to flow from the upper chamber 137 as well as a control nozzle for the amplifier A2.

The tubes 136 and 142 and the upper chamber 137 receive fluid at a predetermined constant reference pressure from a supply 69 by means of a filter 69a, a tube 143 and a nozzle 144. The end of the nozzle 144 is admitted into an opening 145 formed in circular end wall 146 of the capacitance 138, the nozzle serving as a resistance to flow from the tube 143.

The resistances 135 and 148 formed by constrictions at the ends of the tubes 136 and 142, respectively, and the resistance offered to flow by the nozzle 144 cooperate to permit the development of a region of relatively high pressure defined between these resistances and the diaphragm 140, thereby providing a capability of continuous outflow from the ports 133 and from the nozzle 148, even though the ports and the nozzle 148 are heavily backloaded. Thus, even if relatively large static pressures are encountered by the ports 133, flow continues to egress from these ports preventing the ingress of flow from the surrounding fluid medium into the sensor 26. Ordinarily, continuous outflow is necessary in order to prevent the introduction of extraneous material into the sensor from an impure ambient fluid medium. Fluctuations in back pressure developed in the tube 136 are a function of the magnitude of instantaneous static pressures acting on the ports 133, the back pressure in the tube 136 increasing as the static pressure sensed by the probe 132 increases.

The resistances provided by constrictions 135 and 148 acting together and in conjunction with the capacitance of the fluid capacitance 138 establish a resistance-capacitance time constant for the sensor 26 which may be of any desired value. This feature is of primary importance since it is not intended that the sensor cause high frequency pressure signals to be issued from the nozzle 148. High frequency pressure variations may, for example, be produced by a choppy seaway in which the foil 10 is moving, or by minor high frequency perturbations in pressure of the fluid medium surrounding the sensing ports of the probe 132. Since the pressure build-up in the tube 136 is dependent upon the resistance-capacitance time constant of the sensor 26, the sensor can be designed so as to attenuate or damp out undesired high frequency pressure fluctuations or variations. Fluid pressure signal attenuation may be easily effected by adjusting the flexibility of the diaphragm 140, since this also adjusts the capacitance of the fluid capacitance 138 and therefore the time constant of the sensor.

The source 69 and filter 69a may be housed in the craft 13 and the tube 143 encased in a channel formed in the strut 11 so that the fluid capacitance 138 receives only filtered fluid from the tube 143. As mentioned previously, the pressure signals from the depth sensor 26 are compared with the prescribed depth command signal which issues from the source 27 and hence from the control nozzle 149 positioned opposite the control nozzle 148. The displacement of the power stream issuing from the power nozzle 91 is determined by the relative magnitudes of the pressure differentials which exist as a result of fluid stream issuing from control nozzles 148, 149, 72 and 73. Thus, signals from the lift and static pressure sensors are combined in the amplifier A2 with the command depth signal to provide an amplified output signal that maintains the depth and lift of the foil 10 constant as it moves through the medium 14.

In order to stabilize a craft in its medium, it may be desirable to employ pitch and roll rate sensors in the control system. If fore and aft hydrofoils are employed and both are servoed, pitch rate signals may be applied in differential relationship to the controls for the fore and aft hydrofoils to control pitch. If two transversely aligned foils are servoed, then a roll rate signal of a given sense is applied to one or both foils.

A roll rate signal may be employed for control of roll only if two transversely aligned foils are independently servoed. Roll rate signals are applied differentially to the controls for the two foils so that, as angle of attack of one foil is increased, the angle of attack of the other is decreased, thus tending to counter the foil movement.

Referring again to FIGURES 1 and 2, a pitch rate transducer designated as 28a and a roll rate transducer 28b are provided and may be housed in the craft 13 or strut 11. The pitch rate transducer 28a supplies fluid control signals to the control nozzles 150 and 151, respectively, of amplifier A3 whereas the roll rate transducer 28b supplies control fluid signals to the control nozzles 152 and 153 of that amplifier. The pitch and roll rate transducers may be of any suitable conventional design and are preferably of a pure fluid type as disclosed in (1) the Sc. D Thesis of Forbes T. Brown, entitled "Pneumatic Pulse Transmission with Bi-Stable Jet Relay Reception and Amplification," Department of Mechanical Engineering, M.I.T., May 1962, and (2) ASTIA Publication No. AD-277470. The transducers are oriented with their axes of rotation at right angles so that the pitch and the roll of the craft 13 are sensed and the fluid signals issuing from each of these transducers are supplied as control streams to effect displacement of the power stream issuing from the power nozzle 92 of the summing amplifier A3, thereby displacing the power stream relative to the output passages 80 and 81 in accordance with summation of the pressure signals received. The output of the tubes 80 and 81 is pressure amplified by the amplifiers A4 and A5 so as to effect the required pivotal movement of the foil 10 about the pin 12 by means of the servo unit 19. The directional senses of pitch and roll are indicated by the plus and minus signs in FIGURE 2, and those working in the art will be able to couple the transducers 28a insure that the foil 10 develops a constant lift during movement through the water.

As disclosed in greater detail in co-pending U.S. patent application Serial No. 359,758 filed April 14, 1964 by Richard S. Windsor and myself, and entitled "Fluid Lift Sensing and Measuring System," the relationship between the forces of lift sensed and the output pressure signals which issue from the output tubes 123 and 123a may be linear function for optimum locations of the ports 125 and 126 relative to the chord length of the probe 100. This relationship is ordinarily desirable because it obviates problems of sensor and amplifier design that are encountered when the relationship is non-linear. Linearity of pressure with angle of attack may be attained for values of ($\alpha$) in a range of from ±6° to ±20°, depending upon the particular design of the sensor. All of the sensors have basic similarities in design and are provided with faired surfaces continuous from the leading to the trailing edges with the ports located between 2 percent and 20 percent of the chord length of the probe from the leading edge of the probe.

It will be noted that movement of the foil 10 with the sensor 20 attached thereto tends to increase the signal produced by sensor 20 during repositioning of the foil. For instance, if lift is greater than desired, the pressure in passage 121 is larger than in passage 122 and commands counterclockwise rotation of the foil and sensor. Downward (counterclockwise) movement of the sensor 20 tends to increase the pressure at orifice 125 and to decrease this factor at the orifice 126. Thus, the pressure differential between passages 121 and 122 is increased and may tend to produce overshoot and hunting of the foil about the desired final position.

As previously indicated, the sensor 20 may be supported for movement relative to the foil 10 and the support may be such as to eliminate the problems referred to above. Thus, the sensor may be pivotally supported on an arm or arms with the pivot point being located ahead of the leading edge of the sensor. The output passages 123 and 123a would supply signals to amplifier A1 of FIGURE 2 and the sensor is mechanically coupled to the foil so that the sensor 20 is moved to an angle of attack equal to that of the foil. Since the pivot point of the sensor 20 is forward thereof, a signal calling for decrease in angle of attack would cause the sensor to pivot counterclockwise; that is, move upward in FIGURE 1. During movement of the sensor, the pressure on port 126 is increased, thereby reducing the original command signal and preventing overshoot and subsequent hunting of the foil.

The static pressure sensor 26 and the depth command signal source 27 are shown schematically in FIGURES 1 and 2 as supplying fluid control signals to the control nozzles 148 and 149, respectively, of the amplifier A2 so as to effect amplified displacement of the power stream issuing from the power nozzle 91 of that amplifier. The sensor 26 may be of any conventional type which detects the static pressure head on the foil 10 as it moves through the medium 14 and produces a fluid output signal corresponding to foil depth. The depth command signal source 27 may also be of conventional design, taking the form of an adjustable valve 130, FIGURE 5, which receives fluid at constant pressure from a filtered supply 131. By adjustment of the valve 130, the control nozzle 149 receives a pressure bias that is directed to oppose variations in control stream flow from the control nozzle 148. Thus, the depth of the foil 10, as ascertained by the depth sensor 26 can be compared with the desired depth as established by the pressure of the fluid issuing from the depth command source 27 to effect a displacement of the power stream issuing from the power nozzle 91 of the amplifier A2 corresponding to the difference between the commanded and actual depth. Thus, if the depth of the foil 10 increases beyond that limit set by the signal source 27, the control nozzle 148, FIGURE 2, effects displacement of the power stream 91 into the output tube 75. The control nozzle 77 of the amplifier A4 effects displacement of the power stream issuing from the power nozzle 93 into the output passage 84 and hence into the control nozzle 86 so that the power stream issuing from the power nozzle 94 of the amplifier A5 is displaced into the output passage 89, passage 31 and hence, into the lower chamber 23 of the servo unit 19 so that the foil 10 is rotated in a clockwise direction about the pivot 12 thereby raising the leading surface of the foil 10, increasing the lift developed thereby and decreasing the running depth of the foil 10 in the medium 14. Conversely, if the depth sensor 26 receives a static pressure signal less than the depth command signal issuing from the source 27, the power stream issuing from the power nozzle 91 in the amplifier A2 will be displaced into the output tube 74 ultimately causing an increase in pressure in the upper chamber 22 of the servo unit 19 and consequent pivotal movement of the foil 10 in a counterclockwise direction about the strut 11, so that the angle of attack of the foil is decreased to decrease lift and increase the running depth of the foil 10.

The depth sensor 26 may be of any conventional type. However, it is desired to minimize mechanical moving parts in the control system of the foil 10, the sensor 26 illustrated in FIGURE 5 of the drawings provides a fluid system having a minimum number of moving mechanical parts capable of producing a fluid output signal corresponding to variations in depth of the foil in the medium 14.

As disclosed in more detail in my co-pending patent application No. 336,677, filed January 9, 1964, the sensor 26 includes an elongated probe 132, fixed to and located at a position on the strut 11 where it is desired to sense and measure the static pressure of the medium supporting the craft 13. The longitudinal axis of the probe 132 is positioned approximately parallel to anticipated lines of medium flow as shown by the arrows in the figure.

The probe 132 is provided with a series of ports referred to by the numeral 133, the ports being spaced at predetermined intervals around the periphery of the probe so that the ports sense the average of static pressures of the medium around the probe 132 at any instant of time. The axes of the ports 133 are essentially perpendicular to the longitudinal axis of the probe 132 so that the effects of dynamic fluid pressure are minimized. The ports are joined by a manifold 134 which is connected to one end of a tube 136. This end of the tube 136 is provided with a fluid resistance or constriction 135 for restricting flow from and into the manifold 134. The fluid resistance 135 may take the form of a porous plug, or the orifices of the ports 133 may serve this function if the total cross-sectional area of the ports is smaller than that of the tube 136. The tube 136 receives pressurized fluid from an upper chamber 137 of a fluid capacitance 138.

The term "fluid capacitance" as used herein may be defined as that class of fluid energy storage means that store the energy of fluid as potential energy, and in general, the energy stored in a fluid capacitance increases as the quantity of fluid received increases. A fluid capacitance may take one or more of the following exemplary forms: compression of a fluid to a greater density than its normal density, change of thermodynamic state of a fluid, change of fluid internal energy level, compression of one fluid by another fluid separated from the first fluid by a flexible diaphragm or wall, compression of a second fluid in direct contact with a first fluid, deformation of elastic or flexible walls which restrain the fluid, change in elevation of the fluid or change of elevation of a plate supported by the fluid.

The term "fluid" as used herein includes compressible as well as incompressible fluids, fluid mixtures and fluid combinations such as air and water, when compressible fluids are used, a fluid capacitance need not be resilient or expandable but may be made rigid or inflexible. If the and 28b to the control nozzle of the amplifier A3 of each foil's pure fluid control system so that the angle of attack of each foil 10 is altered appropriately to correct for variations in pitch and roll of the craft 13. In control of roll in a system employing two transversely aligned foils, the signals developed by the roll rate transducer 28b are applied in opposite senses to their corresponding amplifiers A3. Thus, the lift developed by one foil is reduced while the lift developed by the other foil is increased, thus tending to counter the roll movement while maintaining total lift constant. The transducers 28a and 28b may be either housed in the craft 13 or embodied in the strut 11.

To summarize briefly, the hydrofoil control system utilizes fluid elements which function with a minimum or no moving parts, the elements being arranged in a fluid circuit to sense, compute and ultimately control the angle of attack of one or more of the foils supporting a craft for movement in a liquid medium. The basic computer circuit includes five pure fluid analog-type amplifiers A1, A2, A3, A4 and A5, the amplifiers A1–A5 inclusive being controlled by fluid signals from lift and depth sensors 20 and 26, respectively, depth command signals from the source 27, and pitch and roll rate signals from the transducers 28a and 28b. Each pure fluid lift sensor 20 provides an output fluid signal which is proportional to the lift developed by its associate foil 10 so that instantaneous changes in the medium local flow conditions and foil speed can be sensed and the angle of attack of the hydrofoil altered such that the foil 10 develops a substantially constant but controllable lift force during movement. In addition, depth command signals provided by the source 27 are compared or summed with the signals from the depth sensor 26 in the pure fluid amplifier A2, the source 27 issuing preselected running depth reference signals for the foil 10 in the medium 14. Thus, the angle of attack of a foil 10 may be changed in accordance with variations in depth of the foil 10 in the medium 14 from the preselected running depth. These signals are amplified and summed with signals dependent upon the pitch and roll rate of the craft 13, in the amplifier A4, and the differential pressure output of the amplifier A4 is amplified in the fluid amplifier A5. The differential pressure output signals which issue from the output passages of the amplifier A5 can be expressed by the following equation:

$$K + C_1\theta_p + C_2\theta_r + C_3L + C_4h = \Delta P_0$$

where:

$K$ is the depth command signal;
$\theta_p$ is the pitch rate of the craft 13;
$\theta_r$ is the roll rate of the craft 13;
$L$ is the lift of the foil 10;
$h$ is the depth of the foil 10 in the medium 14.

$K$, $C_1$, $C_2$, $C_3$, $C_4$ are constants appropriate to the particular foil 10 and its support location relative to the vehicle center of gravity.

The output signal of the pure fluid amplifying system A1 is amplified by the pressure amplifiers A2, A4 and A5 and the pressure signals from the amplifier A3 are amplified by the amplifiers A4 and A5 to provide a pressure signal to effect adjustment of the foil 10 by actuation of the servo unit 19.

Figure 6:
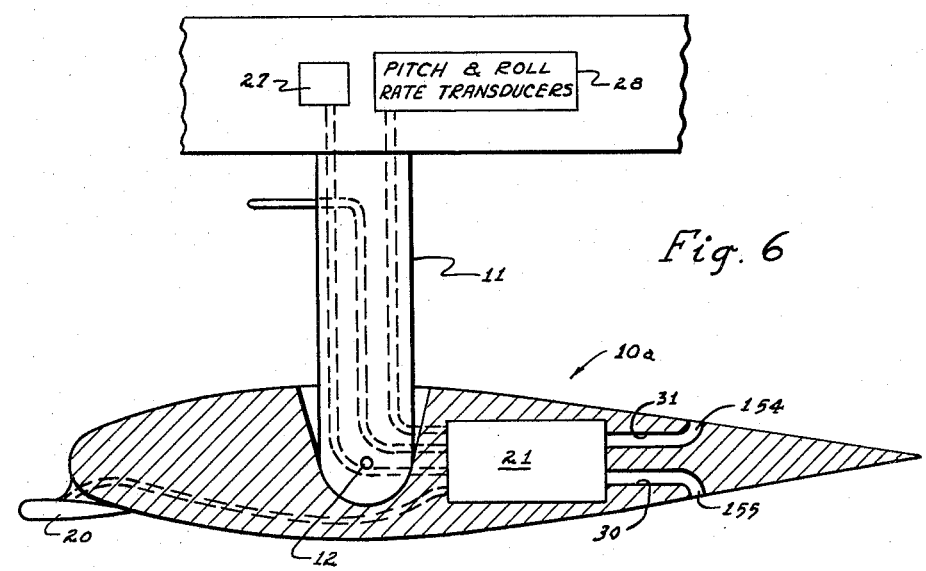
FIGURE 6 illustrates an embodiment of the present invention, wherein the fluid from the pure fluid computing and amplifying system incorporated in a foil produces reactive and pressure effects for altering the position of the foil in the medium.

In accordance with a second embodiment of the present invention, and reference is made to FIGURE 6 of the drawings, a foil 10a, also of the subcavitation type, is provided with a pair of opposed vents 154 and 155 into which fluid flow from the output passages 30 and 31 issues to the upper and lower surfaces of the foil, respectively. In this system, the desired parameter is not pressure but fluid flow and therefore, the pure fluid amplifiers which comprise the control system 21 should be designed to provide maximum flow gain rather than maximum pressure gain. Those working in the pure fluid amplifier art will be able to design amplifiers having this characteristic. The actions of the fluid flows issuing from the vents 154 and 155 produce an opposite reaction due to a combination of momentum exchange and change in the pressure distribution on the surface of the foil 10a, tending to pivot the foil 10a about the connecting pin 12. The foil pivots in a clockwise direction when the rate of fluid flow from the output passage 31 and the vent 154 exceeds that issuing from the output passage 30 and the vent 155, and pivots the foil in a counterclockwise direction when the flow from the passage 30 exceeds that in the output passage 31. In this system, no moving mechanical elements are needed to adjust the angle of attack of the foil 10a, only the working fluid employed in the control system being utilized for this purpose.

In addition to the momentum forces produced by flow from the vents 154 and 155, the pressure distributions of the fluid flowing along and against the upper and lower surfaces of the foil 10a are modified by the flow from the vents 154 and 155. For example, flow from the vent 154 increases the pressure distribution across the upper surface of the foil 10a between the connecting pin 12 and the trailing edge of the foil 10a and the resulting increase in the pressure distribution tends to rotate the trailing edge of the foil 10a clockwise about the pin 12 so as to aid the momentum forces developed by flow from the vent 154. Correspondingly, flow from the port 155, in addition to producing a momentum force that tends to pivot the foil 10a counterclockwise with respect to the pin 12, also increases the pressure distribution downstream of the pin 12 on the lower surface of foil 10a thereby acting in conjunction with the momentum forces caused by flow from the vent 155 to rotate the foil counterclockwise about the pin 12.

Figure 7:
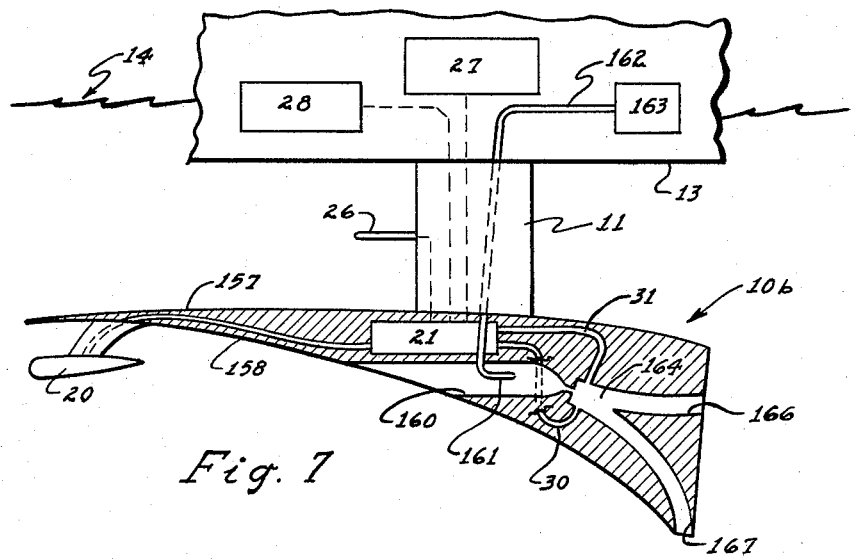
FIGURE 7 is a sectional side view of a supercavitating type of foil incorporating the fluid control system of the instant invention for controlling the lift of the foil.

FIGURE 7 of the drawings illustrates a system for maintaining constant lift of a supercavitating foil 10b employing fluid jet flap control. The foil is formed with a substantially straight upper surface 157 and a concave lower surface 158. As illustrated in FIGURES 2 and 7, the fluid control system 21 receives fluid control signals from the lift sensor 26 attached to the lower surface 158 of the foil 10b and positioned under and forward of the leading edge of the foil, and from the depth sensor and depth command signal sources 26 and 27 and as well as from pitch and roll rate transducers generally designated by the numeral 28 (where appropriate). A main intake nozzle 160 is formed in the foil 10b and communicates through the lower surface 158 of the foil with the fluid of the medium 14. The fluid introduced into nozzle 160 is at some elevated velocity during movement of the foil through a liquid medium 14. The intake nozzle 160 converges as shown, so that the fluid stream which egresses from the nozzle 160 is constricted and acts as a power stream for subsequent displacement by control stream flow issuing from the output passages 30 and 31 of the amplifying system 21 in an interaction chamber 164 provided in the foil 10b. A supplementary source of fluid for the interaction chamber 164 may be supplied from a nozzle 161 which is positioned in the main intake nozzle 160 to issue fluid toward the downstream end of that nozzle, the nozzle 161 being connected by means of a tube 162 to a source of pressurized fluid 163 housed in the craft 13. The tube 162 may be housed in a channel formed in the strut 11. If desired, the main intake nozzle 160 may be eliminated, and the nozzle 161 may supply all the power stream fluid into the interaction chamber 164 from the source 163. The interaction chamber 164 communicates with a pair of outlets 166 and 167 located downstream of the chamber 164, the outlet 166 discharging fluid received thereby from the trailing end of the hydrofoil 10b. Fluid issuing from the outlet 167 on the other hand acts as a jet flap and raises the pressure distribution of fluid along the lower surface 158, thereby increasing the lift of the foil 10b. Because of the supercavitating effect which is developed along the upper surface 157 of the foil 10b and the liquid medium through which the foil is moving, a region of lower pressure is created along the upper surface 157 and this lower pressure region acts to aid the upward movement of the coil 10b, as viewed in FIGURE 7.

The displacement of the fluid issuing from the nozzle 160 and/or the nozzle 161 in the interaction chamber 164 by flow from the passages 30 and 31 is amplified since the configuration provides an additional pure fluid amplifying system. Fluid issuing from the passage 31 effects displacement of the power stream in the chamber 164 into the outlet 167 so that an increase of lift force is developed by the foil 10b, whereas displacement of the power stream by fluid issuing from the passage 30 into the outlet 166 produces minimum lift, primarily since the pressure distribution along the lower surface 158 of the foil is not raised by fluid issuing from this outlet.

The conditions for control of the foil or foils are quite different during take-off and crash diving; that is, during rapid ascending or descending movement of the craft 13 in said fluid medium 14, from the conditions during normal cruising. During normal cruising, the required change of the lift coefficient of the foil is approximately ±0.3. However, during take-off and crash diving, the lift coefficient change may be between ±1.2 and ±1.8. Since the control system is designed primarily for cruising conditions, the system normally cannot accommodate input signals nor produce output signals or foil positioning of the magnitude required for the aforesaid special conditions. Therefore, in accordance with another feature of the present invention, special provision is made for control of the lift coefficient of the foil during take-off and crash diving. To provide a specific example of a type of control for these latter conditions, fluid-controlled, mechanical flow spoilers are employed.

Figure 8:
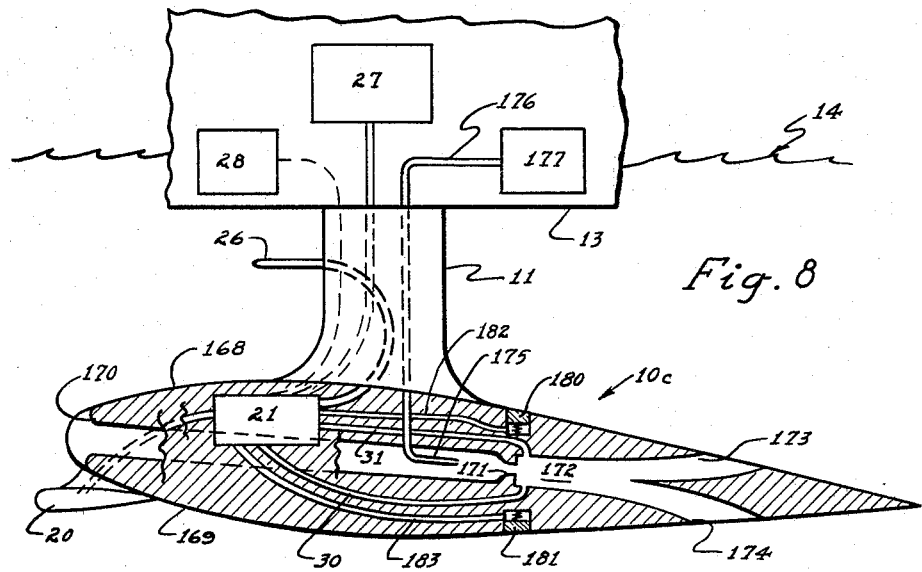
FIGURE 8 is a sectional side view of a foil incorporating another embodiment of the fluid control system of this invention.

Referring now specifically to FIGURE 8 of the accompanying drawings, there is illustrated a fixed position subcavitating type of foil designated generally by the numeral 10c having pure fluid flow control of lift during normal operations. The foil 10c is formed by symmetrically tapering upper and lower surfaces 168 and 169, respectively. The control system for controlling the lift of the foil 10c includes the lift sensor 20 attached to the lower surface 169 and extending forwardly of the leading edge of the coil, the depth sensor and depth command signal sources 26 and 27, respectively, and roll and pitch transducers 28, these monitoring elements supplying fluid control signals for the fluid control system 21. The tubes or passages 30 and 31 receive the output flow from the amplifier 21 as described previously. The foil 10c is provided with a nozzle 170 extending axially through the foil, the nozzle tapering to a nozzle orifice 171 for issuing a constricted fluid stream into an interaction chamber 172 formed in the airfoil. A pair of output passages 173 and 174 are positioned downstream of the chamber 172 and receive fluid issuing therefrom. A nozzle 175 is positioned to issue supplementary flow to the orifice 171, the nozzle being connected to a tube 176 which is housed in the strut 11 and which receives fluid from a source of constant pressurized fluid 177 supported in the craft 13. If desired, the intake nozzle 170 may be dispensed with so that the interaction chamber 172 receives flow solely from the source 177 by means of the nozzle 175. Flow issuing from the output passages 30 and 31 effects displacement of the constricted fluid stream or streams which issue into the interaction chamber 172 relative to the entrance to the outlets 173 and 174 so that the flow received by these outlets is a function of the displacement of the power stream in the chamber 172 by flow from the passages 30 and 31, respectively.

Fluid flow from the outlet 173 increases the pressure distribution along the upper surface 168 of the foil 10c thereby decreasing the lift of the foil, whereas fluid flow issuing from the outlet 174 increases the pressure distribution along the lower surface 169 of the foil 10c, thereby increasing the lift of the foil 10c.

A pair of mechanical flow spoilers 180 and 181 are located adjacent the upper and lower surfaces 168 and 169, respectively, of the foil 10c. The flow spoilers are designed to be actuated selectively for movement outwardly of the surfaces 168 and 169 by fluid pressure from output tubes 182 and 183, respectively, of a pure fluid amplifier A6, FIGURE 2, during take-off and crash diving.

Control nozzles 186 and 187 and the tubes 188 and 189 of the amplifier A6 are connected, respectively, through a T connection (see intersection of passages 118 and 122 of FIGURE 4) with the output passages or tubes 30 and 31.

The amplifier A6 is designed to be insensitive to small signals of the levels encountered in normal control of the foils during cruising. This is accomplished by making a center output passage 184 of the amplifier sufficiently wide that insufficient fluid is deflected to passage 182 or 183 to operate the flow spoilers in response to normal control signals. However, if the power stream of the amplifier A5 is substantially fully deflected, the control signals applied to control nozzles 186 and 187 of amplifier A6 are sufficient to direct enough output flow to one or the other output passage 182 or 183 to operate its associated spoiler. Manual or automatic valves (not shown) may be incorporated in the tubes 182 and 183, the valves normally closing both tubes to flow from the amplifier A6 and being employed to open the tubes to permit take-off and crash diving. During the extreme operating conditions of craft take-off and crash diving, the pressure from the tubes 182 or 183 drastically changes the lift of the foil 10c by means of the mechanical flow spoilers.

During take-off, for example, the depth sensor 26, FIGURE 2, senses maximum depth and therefore develops near maximum static pressure which may cause the pressure of fluid in the control nozzle 148 of the amplifier A2 to override the pressure signal in the control nozzle 149 as established by fluid issuing from the depth command source 27. This condition may cause near maximum displacement of the power stream in the amplifier A2 with the output tube 75 receiving a considerably greater flow than the tube 74. As a result, the amplifiers A4 and A5 may be saturated by the flow from the connecting tubes or passages and the control nozzle 86 of the amplifier A5 will effect displacement of the greater proportion of the flow into the output passage 89 of that amplifier. Since the amplifier A5 may be near saturation, its output 89 will deliver a substantial signal to control nozzle 187 of amplifier A6. As a result, the power stream issuing from the power nozzle 191 of the amplifier A6 is displaced into the output tube 183 and flow from the tube 183 drives the spoiler 181 outwardly from the lower surface 169 of the foil 10c, thereby increasing the pressure distribution along that surface upstream of the spoiler 181, the increase in pressure increasing the lift of the foil 10c to a value not normally obtainable with a foil of the specific design employed.

During a crash dive, the depth command signal source 27 may be manually operated so that a relatively large magnitude output pressure signal is received by the control nozzle 149 of the amplifier A2 to which the source 27 is connected. In this case, the overriding pressure signal from the source 27 displaces the power stream issuing from the nozzle 91 so that the output tube 74 receives the greatest proportion of fluid, the fluid received being great enough when transmitted through the amplifiers A4 and A5 to saturate the amplifier A5 and by issuing from the control nozzle 87 causes strong fluid signals to enter the output tube 188 so as to displace the power stream issuing from the power nozzle 191 of the amplifier A6 sufficiently that it enters into the output tube 182. Fluid from the output tube 182 actuates the spoiler 180 so that the spoiler is moved outwardly of the upper surface 168 of the foil 10c thereby increasing the pressure distribution along that surface upstream of the spoiler 180 and decreasing the lift of the foil 10c.

It will be evident that the systems illustrated in FIGURES 6, 7 and 8 at least partially utilize the output flow of the fluid control system 21 to effect the lift of the foil by changing pressure effects on the surfaces of the fixed foil, whereas in the embodiment illustrated in FIGURE 1, the lift control is achieved by varying the angle of attack of the foil. In the systems of FIGURES 6, 7 and 8, flow rather than pressure is the primary desired output parameter of the computer system. The particular amplifiers forming the control system 21 illustrated in FIGURE 2 are more efficient in amplifying pressure control signals than in amplifying flow control signals. Those working in the art, however, will be able to replace the pressure amplifiers A1–A6, inclusive, with amplifiers which more efficiently amplify fluid flow signals if resort to that expedient is deemed desirable for higher efficiency in the computing operation.

Figure 9:
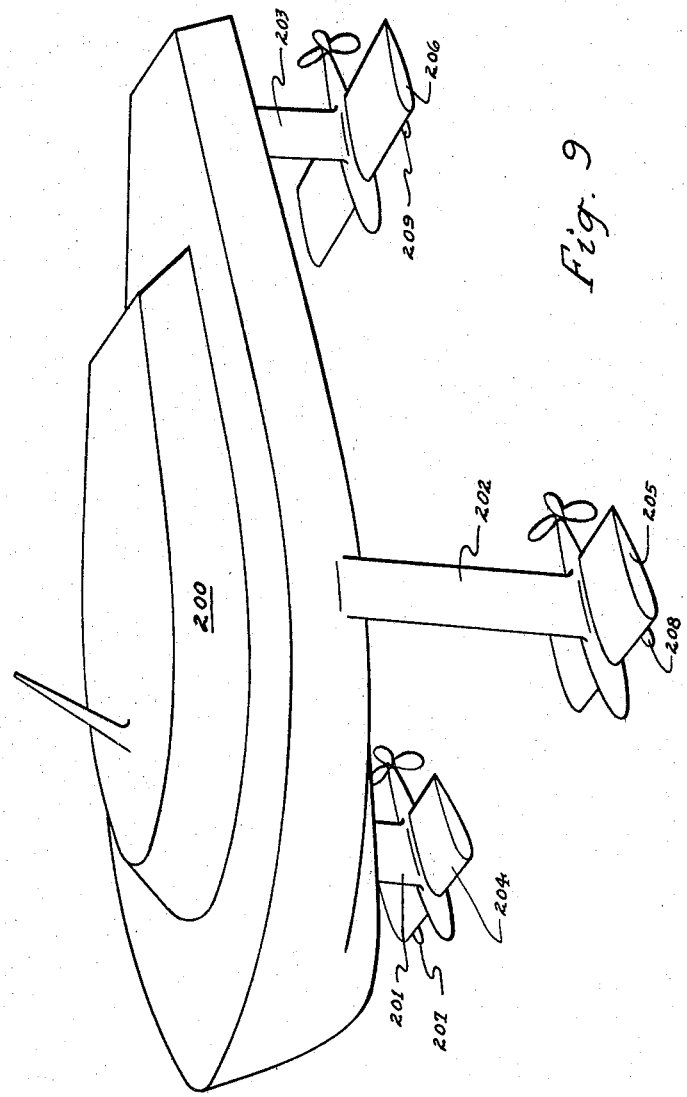
FIGURE 9 is a perspective view of a hydrofoil craft employing three independently servoed hydrofoils.

As has been previously indicated, the foil lift control system of the present invention may be employed with various numbers and types of foil arrangements. Referring specifically to FIGURE 9 of the accompanying drawings, there is illustrated a hydrofoil craft 200 employing three independently servoed hydrofoils.

The craft 200 is provided with two transversely aligned struts 201 and 202 aligned transversely of the longitudinal centerline of the craft positioned toward the bow thereof. Two hydrofoils 204 and 205 are attached to the struts 201 and 202, respectively. A third strut 203 positioned toward the stern of the craft 200 is positioned symmetrically with respect to the longitudinal centerline thereof. A foil 206 is secured to the strut 203.

Each of the foils 204, 205 and 206 is provided with a lift sensor 207, 208 and 209, respectively, and a depth sensor (not illustrated) which may be of the type illustrated in FIGURE 5. In such a foil system, fluid pitch rate signals are applied in one sense to control systems (see FIGURE 2) for the foils 204 and 205 and in a differential sense to the foil 206. Fluid roll rate signals are applied differentially to the control systems of the foils 204 and 205.

Such a system, including lift, depth, roll and pitch rate control servoes the foils such that the craft 200 becomes a stable platform, a desirable result particularly where the craft 200 is to be employed for attack purposes.

FIGURE 9 illustrates two forward foils but it is to be understood that a centered, single, large foil may be employed. In such case, the front foil would be a V-shaped surface piercing on the suitable foil. Roll rate cannot be controlled by the foils in such a case although pitch rate may be. Further, if the front two foils are not servoed, two surface-piercing or ladder-type foils would be employed.

While I have described and illustrated several specific embodiments of my invention, it will be clear that variations of the details of construction which are specifically illustrated and described may be resorted to without departing from the true spirit and scope of the invention as defined in the appended claims.

What I claim is:

1. A system for controlling the position of a foil or the like in a fluid medium comprising sensing means for monitoring variations in the position of the foil relative to a reference plane and for producing fluid output signals corresponding to the variations monitored; at least one pure fluid amplifier coupled to said sensing means, said amplifier including a power nozzle for issuing a constricted power stream, plural output passages located downstream of said power nozzle for receiving fluid therefrom, and a pair of control nozzles angularly disposed with respect to said power nozzle for comparing substantially opposed control streams issuing in interacting relationship with said power stream for effecting displacement of the power stream relative to said output passages; adjustable means connected to one of said control nozzles for providing a predetermined fluid bias signal to said amplifier corresponding to the desired position of the foil relative to said reference plane, the other control nozzle of said pair connected to said sensing means to receive the fluid output signals issuing therefrom, the differential fluid signal issuing from said output passages of said amplifier resulting from displacement of the power stream corresponding to variations in foil position from said predetermined plane; and means for receiving the differential fluid signals issuing from said output passages and varying the position of the foil relative to said plane in accordance with the differentials in fluid signals received.

2. The system as claimed in claim 1 wherein all parts forming the said sensing means remain stationary relative to each other during the position monitoring operation.

3. A system for controlling the position of a foil or the like in a fluid medium comprising plural position sensing means attached to the foil for measuring the position of the foil relative to various position references and producing fluid output signals corresponding to said measurements; staged plural pure fluid amplifiers for summing and successively amplifying the fluid output signals from said sensing means, each amplifier stage including a power nozzle for issuing a constricted power stream into the amplifier, plural output passages located downstream of said power nozzle for receiving fluid therefrom, and at least two pairs of substantially opposed control nozzles angularly located with respect to said power nozzle for issuing substantially opposed control streams in interacting relationship with the power stream issuing from said power nozzle for effecting displacement of the power stream relative to said output passages; the output passages of one stage being connected to one pair of control nozzles of a succeeding stage; means connected to one control nozzle of the other pair of control nozzles of each amplifier for providing a predetermined fluid bias signal to the power stream, the other control nozzle of said other pair of control nozzles of each amplifier coupled to said sensing means and receiving variable fluid signals therefrom, the variable fluid signals issuing from said control nozzles, the fluid bias signals, and the output fluid signals from a preceding amplifier stage causing displacement of the power stream in each amplifier in accordance with the variation in the position of the foil as monitored by said sensing means; and means receiving the fluid signals issuing from the last amplifier stage for changing the position of the foil in accordance with the fluid signals received.

4. A system for controlling the position of a foil or the like in a fluid medium comprising plural position sensing means for monitoring variations in the position of the foil from a predetermined reference axis, each sensing means producing fluid output signals corresponding to the variations monitored; at least a pair of pure fluid amplifiers, each amplifier including a power nozzle for issuing a defined power stream in the amplifier, plural output passages located downstream of said power nozzle for receiving fluid streams therefrom; one amplifier of said pair having a pair of opposed control nozzles angularly positioned with respect to said power nozzle for issuing substantially opposed control streams in interacting relationship with the power stream so as to effect displacement of the power stream relative to said output passages, means connected to one of said control nozzles for providing a first predetermined fluid bias signal to said one amplifier, the other control nozzle of said pair connected to one of said position sensing means so as to receive the fluid signal output therefrom; the other amplifier of said pair of amplifiers having first and second pairs of substantially opposed control nozzles, the first pair of control nozzles connected to the output passages of said one amplifier for receiving fluid output signals therefrom; means connected to one nozzle forming the second pair of said control nozzles for supplying a second predetermined fluid bias signal to said other amplifier; the other control nozzle of said second pair connected to receive fluid signals from another position sensing means, the displacement of the power stream in said other amplifier corresponding to a summation of fluid signals received by said first and second pairs of control nozzles; and means positioned to receive the fluid signals issuing from the output passages of said other amplifier for changing the position of the foil in accordance with the fluid signals received.

5. A system for controlling the position of a foil or the like in a fluid medium comprising first and second sensing means for monitoring variations in two planes of the position of the foil with respect to predetermined reference planes, said sensing means producing fluid output signals corresponding to variations monitored thereby; a pair of pure fluid amplifiers for receiving and amplifying the output signals from said sensing means, each amplifier including a power nozzle for issuing a defined power stream, plural output passages located downstream of the power nozzle for receiving fluid streams therefrom, one amplifier of said pair having a pair of substantially opposed control nozzles angularly disposed with respect to the power nozzle for issuing control streams in interacting relationship with the power stream issuing from that power nozzle, said first sensing means connected to said control nozzles for providing fluid control signals for said one amplifier corresponding to the variations of foil position about one plane; the other amplifier of said pair including first and second pairs of substantially opposed control nozzles angularly disposed with respect to said power nozzle for effecting displacement of the power stream relative to the output passages of said other amplifier, the first pair of said control nozzles connected to the output passages of said one amplifier so as to receive and amplify the fluid signals issuing from said one amplifier; means connected to one nozzle of the second pair of said control nozzles for supplying a predetermined fluid bias signal thereto, the other control nozzle of said second pair of control nozzles connected to the second sensing means for receiving fluid signals therefrom corresponding to variations of foil position about the second plane, said other amplifier summing and amplifying fluid signals received by the control nozzles by displacement of the power stream in said other amplifier; and means formed in said foil for changing the position of the foil in accordance with the fluid signals received from the output passages of said other amplifier.

6. The system as claimed in claim 5 wherein said first sensing means comprises a fluid lift sensor for sensing the lift forces received by the foil during movement thereof.

7. The system as claimed in claim 5 wherein said second sensing means comprises a fluid depth sensor for sensing the average running depth of the foil in the medium, and wherein said means for supplying a predetermined fluid bias signal to said one control nozzle of said second pair of control nozzles comprises means for producing a fluid output signal corresponding to a preselected running depth of the foil in the medium.

8. The system as claimed in claim 5 wherein additional pure fluid amplifiers are coupled to receive fluid from the output passages of said other amplifier for further amplifying the output fluid signals therefrom, and wherein the output from said additional pure fluid amplifier supplies amplified fluid signals to control said means for changing the position of the foil in the medium.

9. The system as claimed in claim 8 wherein said additional pure fluid amplifiers include plural opposed control nozzles for effecting amplified displacement of a power stream flowing in each additional amplifier; and wherein further sensing means for monitoring variations in the position of the foil with respect to a third plane is provided and issues output fluid signals corresponding to such variations monitored, said further sensing means connected to one control nozzle of one of said additional pure fluid amplifiers.

10. The system as claimed in claim 5 wherein the means for changing the position of the foil in accordance with the fluid signals received thereby comprises plural outlet passages formed in said foil, said passages being angularly disposed with respect to each other and with respect to the direction of movement of the foil in the medium.

11. The system as claimed in claim 10 wherein the foil is of the subcavitating type.

12. The system as claimed in claim 10 wherein the foil is of the supercavitating type.

13. The system as claimed in claim 10 wherein the foil is mounted for pivotal movement in the fluid medium, and wherein said outlet passages issue fluid streams outwardly from the foil downstream of the point of pivotal movement so as to effect pivotal movement of the foil.

14. A system for controlling the lift of a foil in its fluid medium comprising a strut, means for pivotally mounting said foil on said strut, fluid sensing means mounted on said foil for determining deviation from a desired value of lift generated by the position of said foil in its fluid medium which lift may be controlled by changing angle of attack of said foil, said means for sensing developing a differential fluid signal which varies as a function of deviation of said lift from said desired value, and means for applying said fluid signal to said foil to produce rotation of said foil to reduce said deviation from said desired value.

15. A system for controlling the lift of at least one foil of a multiple-foil hydrofoil craft in its fluid environment comprising a strut for supporting at least one foil, means for pivotally mounting said foil on said strut, said foil having a hollow chamber formed interiorly thereof, a vane rigidly secured to said strut and dividing said chamber into two isolated regions, sensing means for determining deviation from a desired value of at least one parameter effected by the position of said foil in its environment which parameter may be controlled by changing the lift of said foil, said sensing means developing a pair of fluid signals which vary differentially as a function of deviation of said parameter from said desired value, and passages located in said foil for applying said signals to said two isolated regions of said chamber in such a sense as to cause said foil to rotate in a direction to correct said deviation in the measured parameter.

16. The system as claimed in claim 15 wherein said sensing means comprises a lift sensor positioned forwardly of said foil.

17. A system for controlling the lift of a foil in its fluid environment comprising a strut, a foil rigidly secured to said strut, said foil having a pair of passages located therein and extending through surfaces thereof, one of said passages extending through a lower surface of said foil adjacent the trailing edge thereof, sensing means for determining deviation from a desired value of at least one parameter effected by the position of said foil in its environment which parameter may be controlled by changing the lift of said foil, said sensing means developing a pair of fluid signals which vary differentially as a function of diviation of said parameter from said desired value, and means for applying said fluid signals each to a different one of said passages in such a sense as to change the lift of said foil in the sense determined by at least one of said fluid signals.

18. A foil control system for positioning a foil in its environment comprising means for sensing lift of said foil and producing a first fluid signal indicative thereof, means for measuring the depth of said foil relative to a commanded depth and producing a second fluid signal indicative thereof, fluid amplifier means for combining said signals and producing a further fluid flow signal which is a function of both said first and second fluid signals and means responsive to said further fluid signal for altering the lift of said foil as a function of said further signal.

19. The system as claimed in claim 18 wherein said means for combining comprises at least one fluid amplifier including means for issuing a power stream of pure fluid and means for deflecting said stream as a function of said first and second signals to produce said further fluid flow signal.

20. The system as claimed in claim 19 wherein said means for altering the lift of said foil includes a fluid amplifier having a power nozzle for issuing a power stream of fluid, said nozzle including a passage supplied with fluid from said environment due to movement of said foil therethrough.

21. A system controlling the position of a moving foil or the like submerged in a fluid medium comprising depth sensing means for monitoring variations in the position of the foil in said medium relative to a reference plane corresponding to the average running depth of said foil and for producing fluid output signals corresponding to the variations monitored; at least one pure fluid amplifier coupled to said sensing means, said amplifier including a power nozzle for issuing a constricted power stream, plural output passages located downstream of said power nozzle for receiving fluid therefrom, and a pair of control nozzles angularly disposed with respect to said power nozzle for comparing substantially opposed control streams issuing in interaction relationship with said power stream for effecting displacement of the power stream relative to said output passages; adjustable means connected to one of said control nozzles for providing a predetermined fluid bias signal to said amplifier corresponding to the desired position of the foil relative to said reference plane, the other control nozzle of said pair connected to said sensing means to receive the fluid output signals issuing therefrom, the differential fluid signal issuing from said output passages of said amplifier resulting from displacement of the power stream corresponding to variations in foil position from said predetermined plane, and means for receiving the differential fluid signals issuing from said output passages and varying the position of the foil relative to said plane in accordance with the differentials in fluid signals received.

22. A system for controlling a multiple-foil craft in its fluid environment wherein said craft has two transversely aligned foils and a further foil disposed aft of said two foils, a strut separately supporting each of said foils, a separate sensing means for each of said foils for determining deviation from a desired condition of at least one parameter that is effected by the position of said foil in its fluid environment and which condition of said parameter may be controlled by changing the lift of said foil, each of said sensing means developing a fluid signal which varies as a function of variations of said parameter, separate control means for each of said foils including said foil for changing the lift thereof as a function of said signal, a pitch rate measuring means for generating two pitch rate fluid signals which vary differentially with pitch rate of said craft, means for applying one of said pitch rate signals to said control means of said two foils and for applying the other of said pitch rate signals to said further foil, a roll rate measuring means for generating two roll rate fluid signals which vary differentially with roll rate of said craft, and means for applying one of said roll rate signals to one of said two foils and for applying the other of said roll rate signals to the other of said two foils.

23. The system as claimed in claim 22 wherein each of said sensing means include a depth sensor and a lift sensor.

24. A system for controlling the lift of at least one foil of a multiple foil hydrofoil craft in its fluid environment comprising a strut, means for securing said foil to said strut, sensing means for determining deviation from a desired condition of at least one parameter that is effected by the position of said foil in its fluid environment and which condition of said parameter may be controlled by changing the lift of said foil, said sensing means developing a fluid signal which varies as a function of variations of said parameter, control means including said foil for changing the lift thereof as a function of said signal, flow spoilers disposed in said foil and mounted for controlled outward movement therefrom in response to said fluid flow signal, and means for directing fluid to said flow spoilers to produce extension of at least one of them in response to said fluid signal only above a predetermined magnitude.

25. The system of claim 21 wherein is further provided a fluid lift sensor for monitoring the lift forces received by said foil and for producing other fluid output signals corresponding to the lift force monitored, said amplifier including a second pair of control nozzles connected to said lift sensor to receive the fluid output signals issuing therefrom whereby said differential fluid signal is dependent upon said lift forces monitored.

26. The system of claim 25 wherein said means for receiving the differential fluid signals and varying the position of said foil in response thereto includes a strut for supporting said at least one foil, means for pivotally mounting said foil on said strut, said foil having a hollow chamber formed interiorly thereof, a vane rigidly secured to said strut and dividing said chamber into two isolated regions, and passages located in said foil for applying said signals to said two isolated regions of said chamber in such a sense as to cause said foil to rotate in a direction to correct said deviation in the measured parameter.

27. The system of claim 26 wherein said pure fluid amplifier is located interiorly of said foil.

28. The system of claim 15 wherein said system includes pure fluid amplifier means for amplifying said pair of signals and for combining same for delivery to said passages, said amplifier means being located interiorly of said foil.

References Cited by the Examiner

UNITED STATES PATENTS

| 2,709,979 | 6/55 | Bush et al. | 114—66.5 |
| 3,103,197 | 9/63 | Von Schertel | 114—66.5 |
| 3,137,464 | 6/64 | Horton | 244—78 |

FOREIGN PATENTS

| 882,517 | 7/53 | Germany. |
| 549,266 | 10/56 | Italy. |

FERGUS S. MIDDLETON, *Primary Examiner.*